(12) United States Patent  
Kalm

(10) Patent No.: US 6,581,759 B1
(45) Date of Patent: Jun. 24, 2003

(54) MOLDED NON-METALLIC CONVEYOR APPARATUS

(75) Inventor: W. Scott Kalm, Plano, TX (US)

(73) Assignee: KFGI, Ltd., Dallas, TX (US)

( * ) Notice: Subject to any disclaimer, the term of this patent is extended or adjusted under 35 U.S.C. 154(b) by 0 days.

(21) Appl. No.: 09/938,863

(22) Filed: Aug. 23, 2001

(51) Int. Cl.[7] .............................................. B65G 21/08
(52) U.S. Cl. .............................. 198/860.1; 198/861.1; 193/35 R
(58) Field of Search ...................... 198/860.1, 861.1, 198/841; 193/35 R, 37

(56) References Cited

U.S. PATENT DOCUMENTS

| | | | | |
|---|---|---|---|---|
| 3,890,755 A | * | 6/1975 | Specht ................. | 193/35 R X |
| 4,206,102 A | | 6/1980 | Britain et al. ............. | 260/28 R |
| 4,556,143 A | * | 12/1985 | Johnson ............... | 198/860.1 X |
| 4,880,879 A | | 11/1989 | Bauman ..................... | 525/130 |
| 5,082,109 A | * | 1/1992 | Blondeau ............. | 198/861.1 X |
| 5,178,263 A | * | 1/1993 | Kempen .............. | 198/861.1 X |
| 5,533,606 A | * | 7/1996 | Yuyama ...................... | 198/349 |
| 5,762,177 A | * | 6/1998 | Baker et al. .......... | 193/35 R X |
| 6,028,532 A | * | 2/2000 | Tsurumoto et al. ..... | 198/349 X |

FOREIGN PATENT DOCUMENTS

WO          WO 94/13722       6/1994

* cited by examiner

Primary Examiner—James R. Bidwell
(74) Attorney, Agent, or Firm—Jenkens & Gilchrist, P.C.

(57) ABSTRACT

A conveyor assembly utilizes a plurality of rollers or a belt supported in a frame to convey articles. The frame is manufactured from a non-metallic material possessing physical characteristics that are substantially similar to those experienced with structural metals. More specifically, side frames, lower frames, slider beds, and fasteners used by the frame may be manufactured from the non-metallic material. A radio frequency (RF) reader is position on or near the conveyor assembly to read RF tags applied to items conveyed past the reader by the rollers or belt of the conveyor assembly.

49 Claims, 3 Drawing Sheets

MOLDED NON-METALLIC CONVEYOR APPARATUS

BACKGROUND OF THE INVENTION

1. Technical Field of the Invention

The present invention relates to item conveyors of the roller or belt type which may be installed on a ceiling or floor or built into a shelf facility. The present invention further relates to such conveyors manufactured substantially, if not entirely, of molded, non-metallic constituent parts.

2. Description of Related Art

The configuration of roller or belt type conveyors is well know to those skilled in the art. It is also well known to manufacture such conveyors substantially entirely from metallic (primarily aluminum, steel, stainless-steel or some other structural metal) constituent parts. Examples of such constituent parts include side frames, brackets, rollers, supports, hangers, stands, nuts, bolts, slider bed sections, and the like. A number of difficulties are encountered with the use of metallic part-based conveyors. One noted difficulty concerns noise. Metallic conveyers are well known to rattle, and in a large facility with several hundred linear meters of conveyors, the cumulative rattling noise from these conveyors can be quite disturbing. In fact, occupational health and safety guidelines for the workplace may dictate maximum acceptable workplace noise levels which can be violated by such conveyors. Another difficulty with metallic conveyors concerns maintenance. Metallic conveyors generally must be periodically re-painted. If regular painting maintenance is ignored, the conveyors may become unsightly due to scratching, flaking, peeling or fading and further become more susceptible to wear, decay and rust. Maintenance issues also appear in the context of addressing noise (rattling) through manual repair activities and replacing degraded components. Other maintenance issues concern corrosion of metal parts. Yet another difficulty with metallic conveyors revolves around cost issues. Fabricating metallic conveyors can be quite expensive, not only from the perspective of original design, manufacture and installation, but also with respect to upkeep, repair and maintenance. One further difficulty with metallic conveyors is that they are ill-suited for installation in electromagnetic, electrostatic or radio frequency sensitive environments. For example, the danger of static discharge injuring an employee or maintenance person is a significant concern, and additional protective measures must be taken to ensure proper grounding of the conveyor apparatus. As another example, conveyors are now needed for use in conveying items marked with radio frequency (RF) identification tags, and the metallic nature of the conveyor components adversely affects the ability of an RF reader to accurately detect those tags. What is needed therefore is a new roller or belt conveyor design that addresses the foregoing difficulties.

SUMMARY OF THE INVENTION

A conveyor assembly includes a frame and a transport means for conveying articles that is supported by the frame. The frame is manufactured from a non-metallic material possessing physical characteristics that are substantially similar to those experienced with structural metals. The transport means may comprise either a plurality of transport rollers or a belt.

More specifically, in a preferred embodiment, the non-metallic material used for the frame is an elastomeric material. This elastomeric material may comprise an engineering thermoplastic (like polyurethane) blended or combined with at least one of an ultra-high molecular weight polyethylene, a rubber and/or other filler materials to change the physical properties of the material in a manner similar to alloying steel. A preferred blend features a combination of polyurethane and flourinated polyethylene into curable an elastomeric composite engineered to have mechanical properties including modulus and strength properties which approach those of structural metals and metal alloys.

A conveying system in accordance with the present invention includes the conveyor assembly as described above in combination with an RF reader device wherein the RF reader device is position to read RF tags applied to items conveyed past the reader by the conveyor assembly.

The present invention further includes individual conveyor structural parts and components manufactured of a non-metallic material possessing physical characteristics that are substantially similar to those experienced with structural metals. These structural parts and components comprise: conveyor side frames, lower frames, and slider beds.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
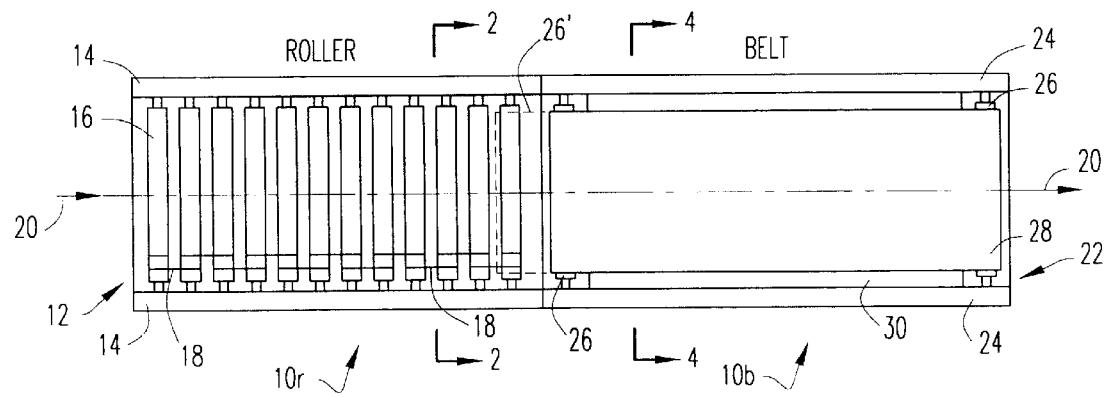
FIG. 1 is a plan view of a combined roller and belt conveyor in accordance with the present invention.

Reference is now made to FIG. 1 wherein there is shown a plan view of a combined roller and belt conveyor in accordance with the present invention. The conveyor is formed from a plurality of sections 10 connected in an end-to-end fashion. Only two sections of different types are illustrated, but it will be understood that a conveyor system may include any number of such sections arranged and assembled in any selected order. One section 10 may comprise a roller conveyor section 10r, and another section may comprise a belt conveyor section 10b. The resulting system assembly may include forming a conveyor having only roller conveyor sections 10r, or forming a conveyor only having belt conveyor sections 10b, or having some combination of sections 10r and 10b.

A conveyor path 20 is provided by each of the sections 10 along which items or articles are transported. The roller conveyor section 10r includes a conveyor frame 12 having a pair of longitudinally extending side frames 14 with a plurality of linear drive/transfer rollers 16 extending laterally there between. The rollers 16 are interconnected with each other by belts 18. Actuation of the roller(s) 16 causes any items or articles resting on the roller surfaces to longitudinally move along the path 20.

The belt conveyor section 10b includes a conveyor frame 22 having a pair of longitudinally extending side frames 24 with a pair of linear drive/transfer rollers 26 extending there between positioned at each end of the section 10b. An endless belt 28 is wrapped around the rollers 26. The belt 28 rests on a slider bed 30 that extends across its width between the side frames 24. Actuation of the roller(s) 26 causes movement of the belt 28 along its length and any items or articles resting on the belt, as supported by the slider bed 30, longitudinally move along the path 20. Although the section 10b is illustrated as having its own rollers 26, it is recognized that the sections 10b may instead use the rollers 16 at the end of an adjacently installed roller conveyor section 10r (as shown with respect to the phantom line belt 28 at reference 26'). This would obviate the need for the section 10b to include its own rollers and drive mechanism.

Figure 2:
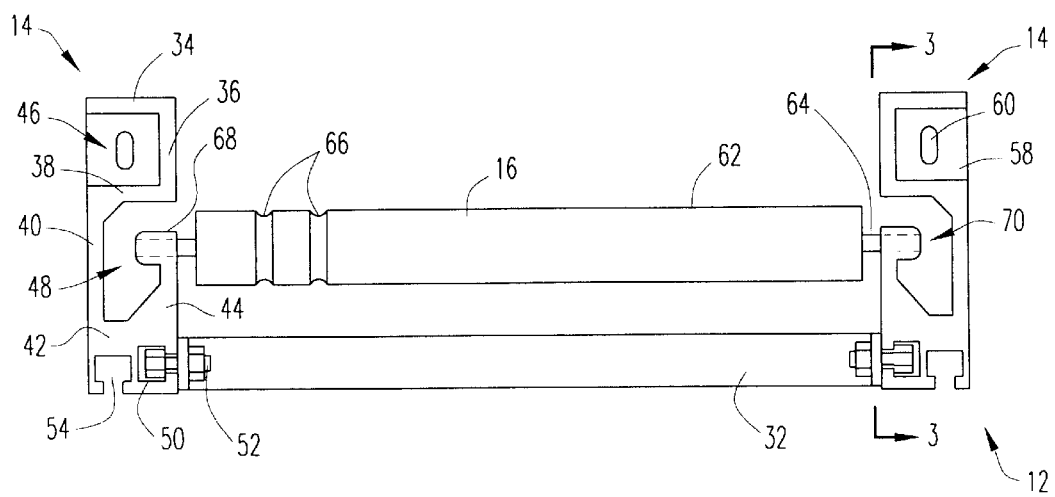
FIG. 2 is a lateral cross-sectional view of a roller conveyor section as shown in FIG. 1.
Figure 3:
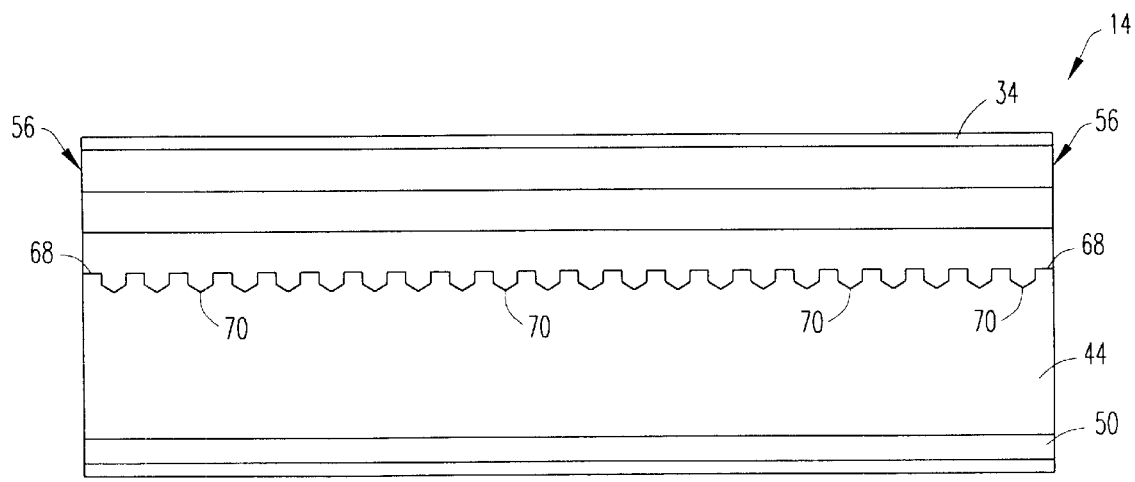
FIG. 3 is a side view of a side frame for the roller conveyor section shown in FIGS. 1 and 2.

Reference is now made to FIGS. 2 and 3 wherein there are shown several views of a roller conveyor section 10r in accordance with the present invention. The conveyor frame 12 comprises the lateral pair of side frames 14 and a lower frame 32 (generally comprising a plurality of bar-like members) that connects the two side frames 14 together at a predetermined distance necessary to suitably support the laterally installed rollers 16. Each side frame 14 is generally S-shaped (or reversed S-shaped) in cross-section. The cross-sectional S-shape of the side frame 14 is defined by: a horizontal roof portion 34; an upper inner plate portion 36 extending downward from the inner end of the roof portion 34; an intermediate horizontal plate portion 38 extending outward from the lower end of the upper inner plate portion 36; a lower outer plate portion 40 extending downward from the outer end of the intermediate horizontal plate portion 38; a bottom horizontal plate portion 42 extending inward from the lower end of the lower outer plate portion 40; and, a lower inner plate portion 44 extending upward from the inner end of the bottom plate portion 42.

The roof portion 34, upper inner plate portion 36 and intermediate plate portion 38 define a first duct section 46 in the upper part of the side frame 14 that provides an exterior opening. This exterior opening for the first duct section 46 may be closed by a flexible cover (not shown) comprising, for example, a synthetic resin panel. In instances where the first duct section 46 and the upper inner plate portion 36 are not required in order for proper operation of the roller conveyor section 10r, the roof portion 34 and upper inner plate portion 36 may be omitted from the side frame 14. In such a situation, the side frame will have a substantially C-shaped cross section defined by the intermediate plate portion 38, lower outer plate portion 40, bottom plate portion 42 and lower inner plate portion 44 which together define a second duct section 48 in the lower part of the side frame 14 that provides an interior opening.

A first dovetail groove portion 50 that is inwardly opened is formed at the corner intersection point of the bottom plate portion 42 and lower inner plate portion 44. The lower frame 32 may be attached to the side frame 14 using the dovetail groove 50 and an appropriately sized nut/bolt/washer fastening assembly 52. The first dovetail groove 50 may further be used for the attachment of other devices and components (such as, for example, electronic components like a programmable logic controller (PLC), drive roller controller (DRC) or a photo sensor/reflector type detector) to the side frame 14 at any suitable longitudinal position. A second dovetail groove portion 54 that is downwardly opened is formed at the corner intersection point of the bottom plate portion 42 and lower outer plate portion 40. Although not illustrated, this second dovetail groove 54 is used with an appropriately sized nut/bolt/washer to attach a conveyor support assembly (such as, for example, a stand, legs or hanger) to the side frame 14 when mounting and installing the conveyor section 10r in an operating facility.

As mentioned previously, the roller conveyor is formed of a number of aligned and interconnected conveyor sections 10. During installation of the conveyor, a number of these sections 10 must assembled together and arranged in such a way that the conveyor path 20 is longitudinally extended. At each end 56 of the side frame 14 is a face plate 58 that covers the end. Adjacent roller conveyer sections 10r are coupled together by connecting the side frames 14 across the joints between adjacent sections using an appropriate nut/bolt/washer fastening assembly (not shown) that extends through an opening 60 in the face plate 58.

Each of the linear rollers 16 is comprised of a roller cylinder 62. A roller shaft 64 is rotatably mounted at each end of the roller cylinder 62 using a bearing (not shown). The roller shaft 64 need not be spring loaded. An annular recess 66 is formed in the roller cylinder 62 at two locations near one end of the linear roller 16. The belt 18 (see, FIG. 1) is passed around the annular recesses 66 of adjacent rollers 16 in order to transmit rotational force between the rollers. Thus, a single linear (drive) roller 16 may be used to drive, through the belts 18, a plurality of other (transfer) rollers.

At an upper edge 68 of the lower inner plate portion 44, a plurality of spaced apart slots 70 are provided into which the roller shaft 64 of the roller 16 sits and is stably supported. The slots 70 have a size and shape selected to substantially match the size and shape of the roller shafts 64. The linear rollers 16 are supported to extend between the side frames 14 between opposed pairs of slots 70, and are retained by their own weight and gravity against vertical displacement. The pitch between adjacent slots 70 is relatively small (on the order of about 2.5 cm). By making appropriate adjustments in the slots 70 selected to support the roller shafts 90 at each end of a roller 16, as well as the use of belts 18 having an appropriate length, the plurality of rollers 16 may be disposed within the side frames 14 at any desired longitudinal pitch.

Figure 4:
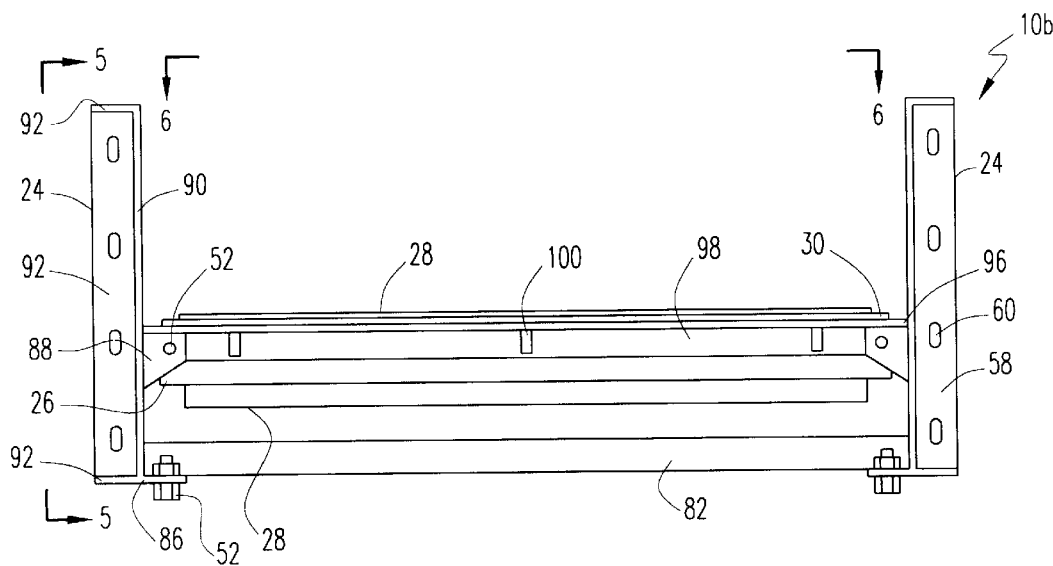
FIG. 4 is a lateral cross-sectional view of a belt conveyor section as shown in FIG. 1.
Figure 5:
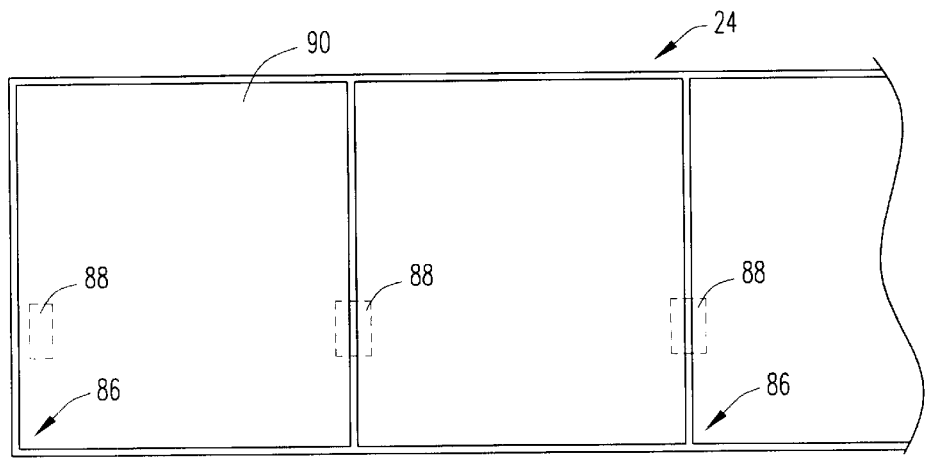
FIG. 5 is a side view of a side frame for the belt conveyor section shown in FIGS. 1 and 4.
Figure 6:
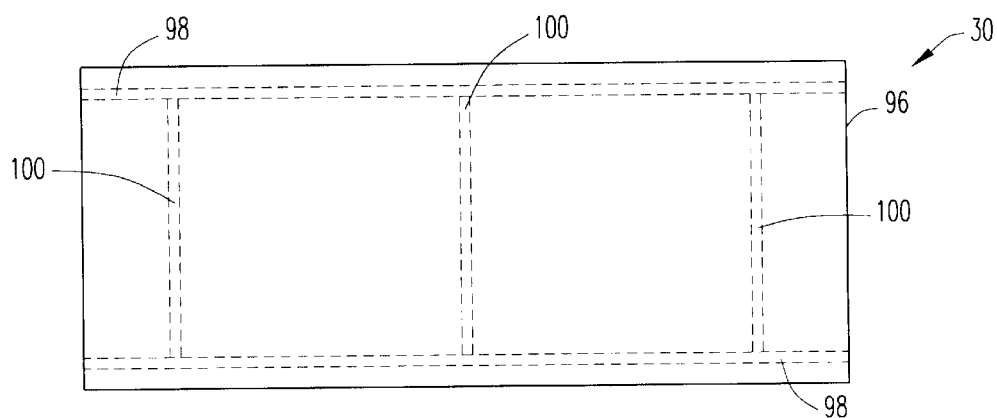
FIG. 6 is a top view of a slider bed for the belt conveyor section shown in FIGS. 1 and 4.

Reference is now made to FIGS. 4–6 wherein there are shown several views of a belt conveyor section 10r in accordance with the present invention. The conveyor frame 22 comprises the lateral pair of side frames 24, the slider bed 30 and a lower frame 82 (generally comprising a bar-like member). The slider bed 30 and lower frame 82 connect the two side frames 24 together at a predetermined distance necessary to suitably support the laterally installed rollers 26 (if used, see reference 26' of FIG. 1) and the belt 28. When installed, the belt 28 rests on the upper surface of the slider bed 30 and returns through an interior duct 84 defined within the side frames 24, the slider bed 30 and lower frame 82.

Each side frame 24 is made of a longitudinally extending web 90 portion that is reinforced for structural rigidity by flanges 92 running along the top and bottom edges, ends and vertically across the interior of the web portion. The side frame 24 further includes a pair of support brackets. A first bracket 86 is mounted to an interior surface of the web 90. A second bracket 88 is mounted at the bottom edge of the web 90, and may comprise a part of the flange 92. The bracket 86 supports the slider bed 30 and is used for mounting the slider bed to the side frame 24 using an appropriately sized nut/bolt/washer fastening assembly 52.

The slider bed 30 includes a sheet member 96 that is reinforced for structural rigidity by lateral flanges 98 and longitudinal flanges 100. More than one slider bed 30 may be required, and assembled end-to-end between the side frames 24, for a given length section 10b. The bracket 86 attaches to the lateral flanges 98. The bracket 88 supports the lower frame 82 and is used for mounting the lower frame to the side frame 24 using an appropriately sized nut/bolt/washer fastening assembly 52.

As mentioned previously, the roller conveyor is formed of a number of aligned and interconnected conveyor sections 10. During installation of the conveyor, a number of these sections 10 must assembled together and arranged in such a way that the conveyor path 20 is longitudinally extended. At each end 56 of the side frame 24 is a face plate 58 that covers the end. Adjacent roller conveyer sections 10b are coupled together by connecting the side frames 24 across the joints between adjacent sections using an appropriate nut/bolt/washer fastening assembly (not shown) that extends through an opening 60 in the face plate 58. It is also recognized that this same mechanism (52, 58 and 60) may be utilized to join a section 10r to a section 10b.

FIG. 1 shows installation of rollers 26 between the side frames 24. These rollers 26 may comprise rollers similar or identical to the rollers 16 described for the section 10r. An appropriately sized and shaped opening may be provided in the web 90 to receive and stably support the shaft 64 for each roller 26. The opening in the web 90 is preferably sized and shaped to substantially match the size and shape of the shaft. A spring loaded shaft may be required for installation of such rollers. As an alternative (not illustrated in FIG. 5, but shown more clearly in FIG. 3 which is incorporated by reference), the side frame 24 may further include a plate 44 (see, specifically FIG. 3) having an upper edge 68 where at least one and perhaps a plurality of spaced apart slots 70 are provided for receiving roller shafts. The slots 70 have a size and shape selected to substantially match the size and shape of the roller shafts 64. Any included linear rollers 26 are supported to extend between the side frames 24 between opposed pairs of slots 70, and are retained by their own weight and gravity against vertical displacement.

Reference is now generally made to FIGS. 1–6. It is well known in the art to manufacture roller conveyor sections 10r and belt conveyor sections 10b from metallic materials (i.e., structural metals) such as aluminum, steel and stainless steel. As recognized herein, a number of difficulties have been noted with respect to conveyors constructed of such materials. In accordance with the present invention, the roller conveyor sections 10r and belt conveyor sections 10b are instead manufactured substantially, if not entirely, of molded, non-metallic constituent parts.

For example, with the roller conveyor sections 10r, it is proposed that at least the side frames 14 and lower frame(s) 32 be manufactured from non-metallic materials. It is further proposed that the nut/bolt/washer fastening assemblies 52 be manufactured from non-metallic materials. It is still further proposed that at least the roller cylinder 62 and perhaps also the shaft 64 be manufactured from non-metallic materials.

Also for example, with the belt conveyor sections 10b, it is proposed that at least the side frames 24, slider bed(s) 30 and lower frame(s) 82 be manufactured from non-metallic materials. It is further proposed that the nut/bolt/washer fastening assemblies 52 be manufactured from non-metallic materials. It is still further proposed that any included roller cylinder and perhaps also the shaft be manufactured from non-metallic materials.

It is vitally important, however, that any conveyor constituent parts manufactured from non-metallic materials possess structural integrity and other physical characteristics (such as, high tensile strength, high flexural modulus, and/or high section modulus) that are substantially similar to that experienced with conventionally utilized structural metals. To that end, it is proposed for the current invention to manufacture as many constituent parts of the conveyor sections 10r and 10b as possible from such non-metallic elastomeric materials. As an example, it is preferred that the parts exhibit a tensile strength of between 8,000 psi and 75,000 psi and a flexural modulus of between 200,000 psi and 3,000,000 psi which are comparable to the characteristics of similar parts manufactured from aluminum, steel or other structural metals. However, it is further possible, with the non-metallic material used herein, to manufacture the constituent parts to exhibit a range of hardness as measured by a durometer from dead soft to 25 Rockwell. Still further, because the material is elastomeric-based, it exhibits a high vibration attenuation that cannot be achieved with structural metals.

More specifically, it is proposed to manufacture the constituent parts from an elastomeric material known generally in the art as "Brandonite" which is available from Globe Rubber Works, Inc. of Rockland, Mass. Generally speaking, the parts are manufactured of a non-metallic material that comprises the blending and combining of particular engineering thermoplastics (like polyurethane) with flourinated polyethylene and/or other filler materials. As a more specific example, polyurethane is blended with various thermoplastic, thermoset and other materials. Still more particularly, one preferred blend features a polyurethane blended or combined with at least one of an ultra-high molecular weight polyethylene, a rubber and/or other filler materials to change the physical properties of the material in a manner similar to alloying steel. A preferred blend features a combination of polyurethane and flourinated polyethylene into curable an elastomeric composite engineered to have mechanical properties including modulus and strength properties which approach those of structural metals and metal alloys which are commonly used in conveyor systems. Various suitable compositions for the non-metallic material, including Brandonite, are available from Globe Rubber Works.

These compositions present a number of advantages. One noted advantage is that constituent parts may be molded out of the material thus obviating the need to engage in expensive extrusion or machining operations that are commonly required for metallic parts. In this regard, it is noted that the proposed composite material has been shown by Globe Rubber Works to be capable of molding into the constituent parts shapes needed for conveyors at relatively low temperatures and low pressures (for example, 325 degrees Fahrenheit or less and 100 psi as compared to 500 degrees Fahrenheit and 1500–5000 psi for convention injection molding techniques) and further that fabrication requires relatively inexpensive casting or transfer mold techniques as opposed to expensive injection molding techniques or machining techniques. Another noted advantage is that the composite material may be colored or dyed thus obviating the need for painting of the part following fabrication and/or assembly. Another noted advantage is that parts made from the material are impervious to rust or related decay. Yet another advantage is that the composite material has some limited conductivity, and thus satisfactorily discharges static electric build-up. Yet another advantage is that the composite material is corrosion, flame or burn resistant, and even when smoldering does not emit toxic fumes. Still further, because the parts are non-metallic in nature, devices manufactured from such parts can be implemented in radio frequency sensitive environments (as will be discussed in more detail herein).

A variety of natural or synthetic materials may be employed as materials of which the constituent parts are formed, but typically the parts are formed from a molded synthetic material, such as elastomeric material like an elastomeric urethane polymer. The resilient material when formed into parts is preferably solid, but in some part applications may be hollow, or a combination of the two, but more particularly the underlying material is a polymeric elastomeric material. The exact nature of the hardness exhibited by the material can be controlled and depends on the specific choices made in alloying the composition components together.

As a further example, the material may be composed of a solid elastomeric polyurethane resin. One particular elastomeric urethane resin which may be employed will be described more particularly.

A preferred composition, designated "Brandonite" by the Globe Rubber Works, includes an aliphatic diisocyanate, isophorone diisocyanate (IIPI) in the form of a prepolymer with the polytetramethylene ether glycol (PTMEG), and an aromatic diisocyanate, toluene diisocyanate (TDI) in the form of a prepolymer with the same polyol. The prepolymers are cured with two amines, 4,4'-methylenebis[3-chloro-2,6-diethylaniline] (MCDEA) and trimethylene glycol di-p-aminobenzoate (TMAB). A fluorinated ultrahigh molecular weight polyethylene powder is mixed with the prepolymers and the curing agents and cured to form the desired part. In a particularly preferred composition 30 parts of the IIPI prepolymer is mixed with 70 parts of the TDI prepolymer and based on the total weight of the prepolymers, 9.8 parts per hundred of MCDEA and 23.1 parts per hundred of TMAB are added, along with 27 parts per hundred of the fluorinated ultrahigh molecular weight polyethylene powder. The mixture is introduced into a mold cavity and allowed to set and thereafter cured at about 250° F. for 2–3 hours in an oven. After oven curing, the part is post-cured at a lower temperature for an additional 16 hours before being ready for use.

A more detailed description of the preferred composition plus alternatives may be obtained in co-pending application for patent Ser. No. 09/939541, entitled "Non-Metallic Composition for Structural Uses," filed concurrently herewith, the disclosure of which is hereby incorporated by reference.

Figure 7:
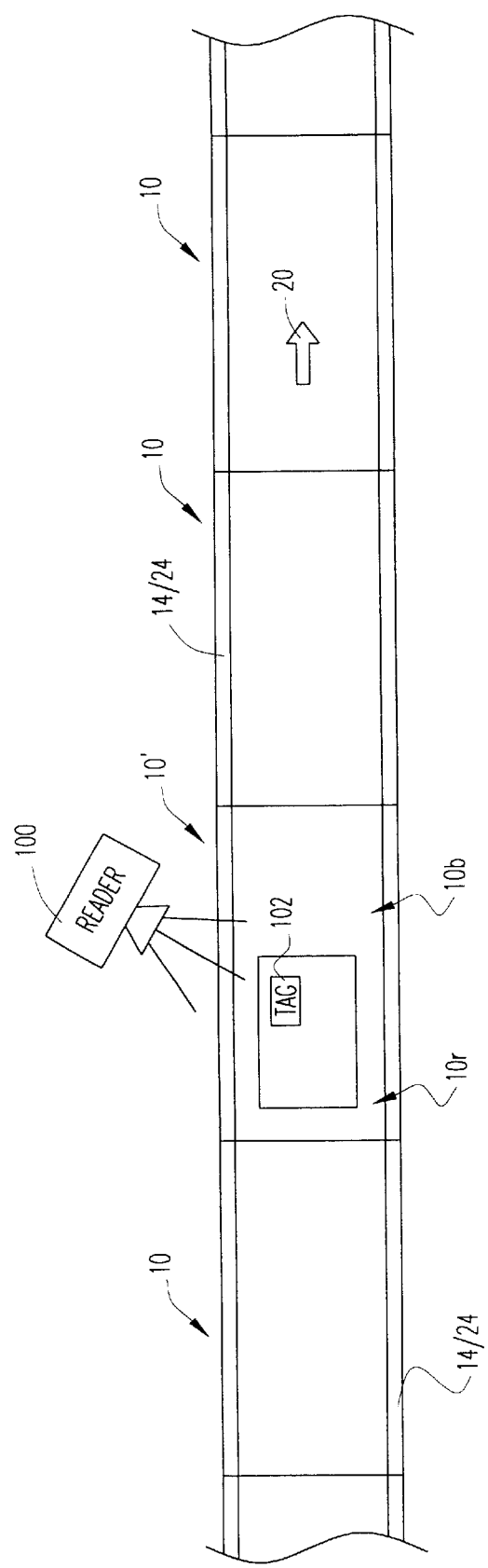
FIG. 7 is a schematic view of a conveyor system in accordance with the present invention.

Reference is now made to FIG. 7 wherein there is shown a schematic view of a conveyor system in accordance with the present invention. A plurality of conveyor sections 10 are arranged end-to-end. These sections may comprise any combination of roller conveyor sections 10r and/or belt conveyor sections 10b. As discussed above, the sections 10r and 10b included in the conveyor system are preferably manufactured substantially, if not entirely, of molded, non-metallic constituent parts. It is also recognized that the conveyor system may include sections 10 manufactured of metallic components as is well known in the prior art. In any event, at least one section 10' must comprise a non-metallic section 10r or 10b of the present invention. The reason for this is that in the conveyor system of the present invention it is at this section 10' where radio frequency sensing operations occur. More specifically, the conveyor system includes a radio frequency (RF) reader 100 positioned to scan or sense RF tags 102 affixed or attached to items or articles passing through the section 10'. Positioning in this context may include physically mounting the reader 100 to the section 10' (for example, to the side frame 14/24), or installing the reader proximate to the section 10'. RF sensing in this environment is supported and successful because the section 10' comprises a section 10r or 10b of the present invention which is manufactured substantially, if not entirely, of molded, non-metallic constituent parts. In this regard, the minimization of metallic components present in the section 10' serves to minimize the risk of reflecting, perturbing, or otherwise adversely affecting the radio frequency sensing signal generated by the reader 100 and/or the ability of the reader to detect and decode radio frequency signals emitted from the tags 102.

The conveyor system described above is particularly useful as a component of an airport baggage handling system. It is also useful as a component of a courier package handling system. In these applications, baggage, packages, items, and the like may be tagged with RF tags 102, transported by the sections 10/10', and the reader 100 may operate to detect and identify transported items by reading the identifying RF tag.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:
1. A conveyor assembly, comprising:
   a frame having components comprising:
      a pair of longitudinally extending side frames; and
      a lateral lower frame that connects the two side frames together at a predetermined distance necessary to suitably support conveyor rollers;
   wherein each of the recited components of the frame are manufactured from a non-metallic material possessing physical characteristics that are substantially similar to the physical characteristics of a structural metal; and
   transport means supported by the frame and operable to convey carried items.

2. The conveyor assembly as in claim 1 wherein the transport means comprises a plurality of conveyor rollers laterally mounted in the frame, each conveyor roller including a roller cylinder and a rotatably mounted roller shaft at each end thereof.

3. The conveyor assembly as in claim 2 wherein the roller cylinder is also made of the non-metallic material.

4. The conveyor assembly as in claim 1 wherein individual components of the frame manufactured of the non-metallic material exhibit:
   a tensile strength in the range of about 8,000 to 75,000 psi; and
   a flexural modulus in the range of about 200,000 to 3,000,000 psi.

5. The conveyor assembly as in claim 1 wherein individual components of the frame manufactured of the non-metallic material exhibit:
   a tensile strength of no less than 8,000 psi; and
   a flexural modulus of no less than 200,000 psi.

6. The conveyor assembly as in claim 1 wherein the components of the frame further comprise:
   a slider bed that connects the two side frames together at a predetermined distance necessary to suitably support a conveyor belt upon which the carried items are conveyed.

7. A conveyor assembly, comprising:
a frame manufactured from a non-metallic elastomeric material possessing physical characteristics that are substantially similar to the physical characteristics of a structural metal; and
transport means supported by the frame and operable to convey carried items.

8. The conveyor assembly as in claim 7 wherein the non-metallic elastomeric material comprises a blended curable combination of polyurethane and polyethylene.

9. A conveyor system, comprising:
a conveyor section having:
a structural frame that is manufactured from a non-metallic material possessing physical characteristics that are substantially similar to the physical characteristics of a structural metal; and
transport means supported by the non-metallic structural frame and operable to convey carried items each marked with a radio frequency (RF) identifying tag; and
an RF reader positioned adjacent the conveyor section and operable to read the RF identifying tags marked on each conveyed carried item;
wherein the non-metallic material comprises a blended curable combination of polyurethane and polyethylene.

10. The conveyor system as in claim 9 wherein the transport means comprises a plurality of conveyor rollers laterally supported by the structural frame.

11. The conveyor system as in claim 9 wherein the transport means comprises a conveyor belt supported by the structural frame.

12. The conveyor system as in claim 9 wherein the non-metallic material comprises a composite exhibiting:
a tensile strength greater than about 8,000 psi; and
a flexural modulus greater than about 200,000 psi.

13. Components of a conveyor frame comprising a pair of longitudinally extending side frames and a lateral support frame for connecting the pair of side frames together in spaced apart relation wherein those components are entirely manufactured from a non-metallic material possessing physical characteristics that are substantially similar to the physical characteristics of a structural metal.

14. Components as in claim 13 wherein the non-metallic material comprises a blended curable combination of polyurethane and polyethylene.

15. Components as in claim 13 wherein the each component manufactured of the non-metallic material exhibits:
a tensile strength of greater than about 8,000 psi; and
a flexural modulus of greater than about 200,000 psi.

16. Components as in claim 13 further including a slider bed for supporting a conveyor belt.

17. The component as in claim 13 wherein the structural metal comprises a metal selected from the group consisting of aluminum, steel, and stainless steel.

18. A component of a conveyor frame wherein that component is manufactured from a non-metallic material comprising a blended curable combination of polyurethane and polyethylene possessing physical characteristics that are substantially similar to the physical characteristics of a structural metal.

19. The component as in claim 18 wherein the component manufactured of the non-metallic material exhibits:
a tensile strength in the range of about 8,000 to 75,000 psi; and
a flexural modulus in the range of about 200,000 to 3,000,000 psi.

20. The component as in claim 18 wherein the component manufactured of the non-metallic material exhibits:
a tensile strength of no less than 8,000 psi; and
a flexural modulus of no less than 200,000 psi.

21. A conveyor assembly, comprising:
a frame manufactured from a non-metallic material possessing tensile strength and flexural modulus characteristics that are substantially similar to the tensile strength and flexural modulus characteristics of a structural metal; and
transport means supported by the non-metallic frame and operable to convey carried items.

22. The conveyor assembly as in claim 21 wherein the structural metal comprises a metal selected from the group consisting of aluminum, steel, and stainless steel.

23. The conveyor assembly as in claim 21 wherein the frame comprises a pair of side frames and a laterally extending slider bed.

24. The conveyor assembly as in claim 21 wherein the frame comprises a pair of side frames and a laterally extending support frame.

25. The conveyor assembly as in claim 21 wherein the frame comprises a pair of side frames.

26. A component of a conveyor frame selected from a group consisting of a longitudinal side frame and a lateral support frame wherein that component is manufactured from a non-metallic elastomeric material possessing physical characteristics that are substantially similar to the physical characteristics of a structural metal.

27. The component as in claim 26 wherein the non-metallic elastomeric material possesses tensile strength and flexural modulus characteristics that are substantially similar to the tensile strength and flexural modulus characteristics of the structural metal.

28. A component of a conveyor frame wherein that component is manufactured from a non-metallic material possessing physical characteristics that are substantially similar to the physical characteristics of a structural metal and wherein the component is manufactured by casting the non-metallic material into a desired shape.

29. A conveyor system, comprising:
a conveyor section having:
a pair of longitudinal side frames connected by a lateral support frame wherein the side frames and support frame are manufactured from a non-metallic material; and
transport means supported by the side frames and operable to convey items each marked with a radio frequency (RF) identifying tag; and
an RF reader operable to read the RF identifying tags marked on each conveyed item as the items are carried through the conveyor section.

30. The conveyor system as in claim 29 wherein the transport means comprises a plurality of conveyor rollers laterally supported by the side frames.

31. The conveyor system as in claim 29 wherein the conveyor section further includes a slider bed and the transport means comprises a conveyor belt supported by the slider bed.

32. A conveyor assembly, comprising:
a conveyor belt operable to carry conveyed items; and
a frame having components comprising:
a pair of longitudinally extending side frames;
a lateral lower frame that connects the two side frames together; and
a slider bed that connects the two side frames together at a predetermined distance necessary to suitably support the conveyor belt;

wherein each of the recited components of the frame are manufactured from a non-metallic material possessing physical characteristics that are substantially similar to the physical characteristics of a structural metal.

33. The conveyor assembly of claim 32 further including an RF reader positioned adjacent to the conveyor assembly and operable to read an RF identifying tag present on each conveyed item.

34. The conveyor assembly as in claim 32 wherein the non-metallic material used for the components of the frame exhibits:
   a tensile strength of greater than about 8,000 psi; and
   a flexural modulus of greater than about 200,000 psi.

35. The conveyor assembly as in claim 32 wherein the physical characteristics comprise tensile strength and flexural modulus.

36. The conveyor assembly as in claim 32 wherein the non-metallic material comprises a elastomeric material.

37. The conveyor assembly as in claim 32 wherein the non-metallic material comprises a blended curable combination of polyurethane and polyethylene.

38. A component of a conveyor frame wherein that component is manufactured from a non-metallic material possessing physical characteristics that are substantially similar to the physical characteristics of a structural metal such that the component at least exhibits:
   a tensile strength of no less than 8,000 psi; and
   a flexural modulus of no less than 200,000 psi.

39. The component as in claim 38 wherein the component comprises a longitudinally extending non-metallic side frame for supporting conveyor rollers.

40. The component as in claim 38 wherein the component comprises a lower frame for connecting two side frames together.

41. The component as in claim 38 wherein the component comprises a slider bed for supporting a conveyor belt.

42. A component of a conveyor frame wherein that component is manufactured from a non-metallic material possessing physical characteristics that are substantially similar to the physical characteristics of a structural metal and wherein the component is manufactured by transfer molding the non-metallic material into a desired shape.

43. A conveyor system, comprising:
   a conveyor section having:
      a structural frame that is manufactured from a non-metallic material possessing physical characteristics that are substantially similar to the physical characteristics of a structural metal; and
      transport means supported by the non-metallic structural frame and operable to convey carried items each marked with a radio frequency (RF) identifying tag; and
   an RF reader positioned adjacent the conveyor section and operable to read the RF identifying tags marked on each conveyed carried item.

44. The conveyor system as in claim 43 wherein the transport means comprises a plurality of conveyor rollers laterally supported by the structural frame.

45. The conveyor system as in claim 43 wherein the transport means comprises a conveyor belt supported by the structural frame.

46. The conveyor system as in claim 43 wherein the non-metallic material comprises a composite exhibiting:
   a tensile strength in the range of about 8,000 to 75,000 psi; and
   a flexural modulus in the range of about 200,000 to 3,000,000 psi.

47. The conveyor system as in claim 43 wherein the non-metallic material comprises a blended curable combination of polyurethane and polyethylene.

48. The conveyor system as in claim 43 wherein the physical characteristics comprise tensile strength and flexural modulus.

49. The conveyor system as in claim 43 wherein the structural metal comprises a metal selected from the group consisting of aluminum, steel, and stainless steel.

* * * * *